United States Patent

[11] 3,618,822

[72] Inventor August J. Hildenbrandt, Jr.
 Fairfield, Conn.
[21] Appl. No. 830,722
[22] Filed June 5, 1969
[45] Patented Nov. 9, 1971
[73] Assignee Universal Oil Products Company
 Des Plaines, Ill.

[54] EMERGENCY OXYGEN SUPPLY DEVICE
 3 Claims, 4 Drawing Figs.
[52] U.S. Cl. .............................................. 222/3,
 137/69, 138/42, 222/464
[51] Int. Cl. .............................................. B67b 7/00
[50] Field of Search .......................................... 222/3, 464;
 137/69; 138/44, 42

[56] References Cited
 UNITED STATES PATENTS
2,455,298 11/1948 Cahenzli, Jr. ................. 138/42
1,874,356 8/1932 Rowley ........................ 137/69
1,900,764 3/1933 Rowley ........................ 137/69
2,115,371 4/1938 Mossberg ..................... 137/69 X
2,435,040 1/1948 Heidbrink et al. ............. 222/3
2,666,297 1/1954 Skousgaard ................... 222/3
3,245,583 4/1966 Miller et al. .................. 222/464 X Primary Examiner—Robert B. Reeves
Assistant Examiner—Francis J. Bartuska
Attorneys—James R. Hoatson, Jr. and Philip T. Liggett ABSTRACT: A gas supply unit (such as for the supply of emergency oxygen) with such unit comprising a high-pressure gas cylinder having a gas release section that provides laminar flow through a capillary tubing section so as to obviate the need of moving parts in the gas flow regulation from the interior of the cylinder to a gas outlet nozzle. A preferred embodiment uses a pull pin, together with a movable rod and rupture disc means, that are all downstream from the capillary tubing as the actuator means to initiate flow from the high-pressure cylinder.

PATENTED NOV 9 1971 3,618,822

INVENTOR:
August J. Hildenbrandt, Jr.

BY: James R. Hoatson, Jr.
Philip T. Liggett
ATTORNEYS

EMERGENCY OXYGEN SUPPLY DEVICE

The present invention relates to an improved form of supplemental gas supply unit and more particularly to a unit which may be used as an emergency oxygen supply device for an individual. For example, a supply kit of the present form might well be used to provide emergency oxygen to a passenger in an aircraft in the event of the loss of normal cabin pressure.

There are, of course, many forms of emergency oxygen supply kits which are in general use. Certain of the gas supply systems utilize high-pressure oxygen storage cylinders in order to minimize the size of the storage cylinder or other container, in the system; however, in connection with the high-pressure systems it is necessary to have special pressure release means from the cylinder to bring the gas pressure down to substantially atmospheric pressure at the user's mask. Many types of valves and other types of pressure release systems have been device for emergency oxygen systems, but, generally, such release systems have utilized complex arrangements of movable adjustment members, or flow control means, in addition to movable actuator means. Where a number of movable members are involved, or where fine adjustments are required in connection with moving parts, there is always concern as to the 100 percent operability or efficiency of the system, and particularly a concern with respect to emergency units which may be stored for long periods of time.

In this instance, it is an object of the present invention to provide for a gas release from high pressure to low pressure without any recompression in the storage container and through a release section which requires no movable operating parts, other than for initial actuating means.

It is a further object of the overall emergency gas storage and release system to incorporate capillary tubing with laminar gas flow therethrough as a part of the normal gas release means.

Another object of the invention is to provide a safety release means for an "overpressure" gas outlet arrangement. Still other objects and advantages in the present gas storage release system will be noted in connection with subsequent descriptive aspects set forth hereinafter.

Broadly, the present invention provides a gas supply unit for emergency use, which comprises in combination, a high-pressure cylinder, a gas release section connected to and extending into said cylinder, with such release section providing at least in part a laminar flow passageway portion through the interior thereof to reduce gas pressure to a gas outlet nozzle on the exterior of such section, said gas release section further having a gas inlet portion, an open-ended and extended length capillary tubing from the latter as said laminar flow passageway portion and extending from the inlet portion of the release section to a larger gas passageway portion, the latter in turn communicating with the gas outlet nozzle, movable flow-blocking means within said larger gas passageway portion, and external actuating means connective to said movable flow-blocking means whereby gas flow can be initiated from the interior of the high-pressure cylinder to said gas outlet nozzle for use therefrom.

The utilization of a capillary tubing arrangement in order to effect a pressure reduction from the interior of the cylinder to the outlet nozzle of the unit, is of particular advantage in eliminating moving parts from the gas release system. It is of course, not intended to limit the present device to any one pressure level although, in order to provide a small-sized container or cylinder which will have gas supply of the order of at least about 10 to 15 minutes, there may be pressures of the order of 3,000 to 5,000 p.s.i.g. or higher. In the present design, the size of the capillary tubing in the outlet passageway, in a manner to provide laminar flow for the high-pressure gas release from the interior of the cylinder, will also be varied to suit the particular pressure conditions to be used in the gas supply unit.

The term "laminar", as used herein, means a viscous flow or a streamline flow (which in turn is defined as having a line which lies in the direction of flow at every point at a given instant) where the streamlines within the flow remain distinct from one another over their entire length. As found in the present system, the use of capillary tubing to provide laminar flow, eliminates the need for adjustable valves or other moving parts in effecting the controlled gas release from the container, except to the extent necessary to have actuating means provide for the initiation of gas flow from the interior of the cylinder to an outlet nozzle.

Various types of actuating means may be provided within the scope of the present invention; however, in a generally preferred design there will be utilized a simple pull pin arrangement to effect the actuation of flow from the interior of the gas container. It is also a feature of a preferred arrangement to utilize rupture disc means in the gas release system in order to have tight gas seals in the unit which are resistant to leakage over long storage periods. In one embodiment, the gas flow passageway downstream from the capillary tubing section will have a rupture disc to provide gas flow blockage, while a movable "backup" plug or rod member is used in combination with the rupture disc, so that the latter will remain unbroken and block the gas passageway. The actuation is such that upon the release of a pull pin and a resulting longitudinal movement of the rod member away from the rupture disc, the latter will be permitted to be broken by the outward gas pressure. A continuing gas flow is then accomplished around the "backup" rod member to an outlet nozzle, until the pressure from the container is entirely released as flow through the capillary tubing.

As an additional feature, the gas supply unit may have a seal means positioned over the zone of the actuating means, in line with the gas passageway, such that where it is observed that there is a broken seal then it will be known that there has been movement of the backup rod arrangement and as escape of gas through the rupture disc. Conversely, an unbroken seal will quickly show that there has been no movement of the actuating mechanism and no escape of gas through the rupture disc and into the outlet passageway.

As still another safety feature, the preferred embodiment of the emergency gas supply device will have an overpressure burst disc in turn blocking a special "overpressure" emergency outlet passageway system. Thus, where there is a rupture of the burst disc from excessive pressure conditions within the cylinder, there can be an escape of the high-pressure gas from the storage cylinder into the overpressure outlet system and a nonharmful dissipation of the pressure. The preferred overpressure gas escape system is designed to use vents which are diametrically opposed so as to in turn avoid any thrust or torque on the unit. Again, preferably, thin seals are placed over the external outlets or vents for the overpressure escape system so that one may readily observe as to whether or not the unit has maintained its pressure within the storage container.

In still another aspect, a preferred embodiment utilizes a filter means upstream and ahead of the capillary tubing interior opening so as to preclude any small particles entering into the capillary tubing and effecting a blocking of the controlled gas flow. The filter means is preferably of a frit nature such as of sintered stainless steel.

Reference to the accompanying drawing and the following description thereof will serve to show the design and construction of one embodiment of the present improved emergency gas supply unit as well as point out additional advantageous features incorporated in the gas release system from the high-pressure container.

Figure 1:
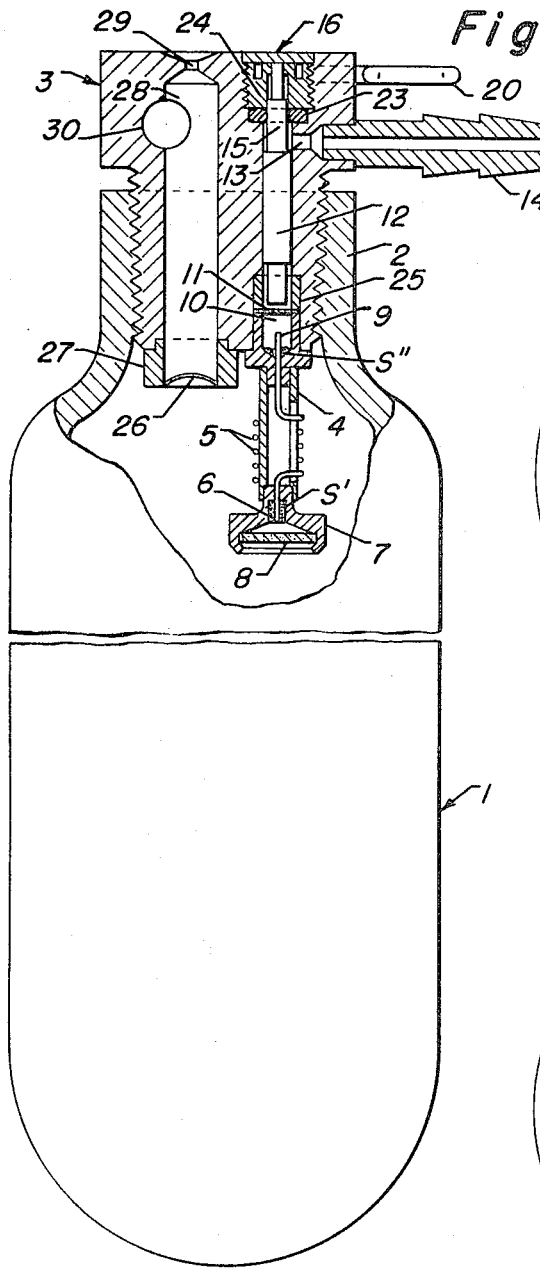
FIG. 1 of the drawing is an elevational view, partially in section, showing the gas outlet means from the interior of the high-pressure cylinder, including the location of the respective rupture and burst disc means.
Figure 2:
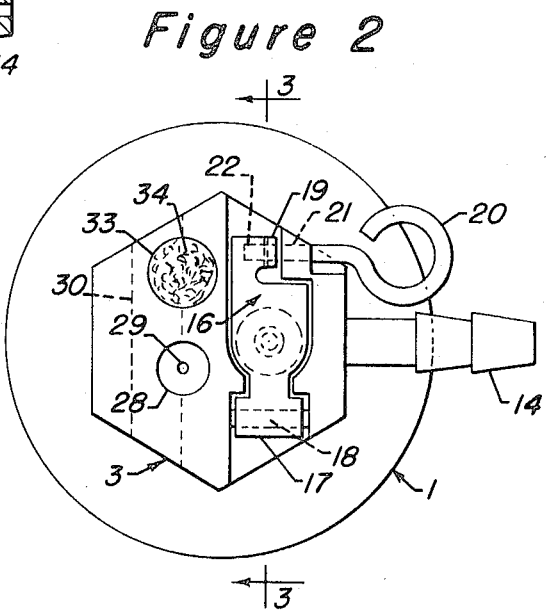
FIG. 2 of the drawing is a diagrammatic plan view of the top of the release section of the emergency gas supply device, indicating a pull pin for holding a hinged cap member in place.
Figure 3:
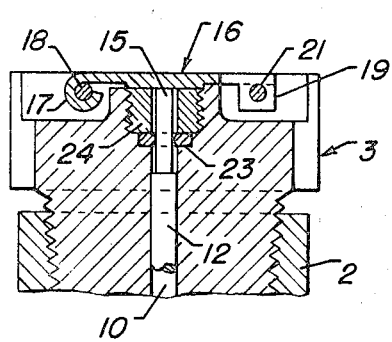
FIG. 3 indicates, in a side sectional view and as shown by line 3—3 in FIG. 2, the use of the pull pin to effect the holding of the actuating mechanism for releasing gas from the supply unit.

Referring now particularly to FIGS. 1, 2 and 3 of the drawing, there is shown a high-pressure storage cylinder or container 1 having a threaded end portion 2 in turn adapted to accommodate a large threaded plug form of release section 3 which contains a controlled gas release passageway and an emergency "overpressure" gas release passageway system. For a controlled gas release arrangement, there is provided an internally projecting support tube 4 for accommodating a coil of capillary tubing 5 which in turn has an inlet end 6 terminating within a filter support ring 7 and downstream from a transverse filter member 8. The opposite downstream end, or outlet end 9, of the capillary tubing 5 terminates within an outlet passageway zone 10 having a transverse rupture disc 11. The high-pressure oxygen, or other gas, in container 1 may thus flow through the filter member 8 and capillary tubing 5 to the outlet passageway 10 where it is stopped by rupture disc 11.

Various types of actuating means may be provided in combination with rupture disc means in order to effect a release of gas pressure from a cylinder; however, in accordance with the embodiment of the present invention, there is utilized a thin readily breakable disc member 11 in combination with a "-backing-up" plug or rod member 12 which is slidably movable within the passageway 10. Thus, upon the rupture of the disc 11 there may be a gas flow around rod 12 into passageway 13 and thence into outlet nozzle 14. The latter may in turn connect with tubing or directly to a suitable nose mouth mask or to a full face mask means. Although the present gas supply device is particularly useful for emergency oxygen, it is not intended to use any one type of mask and, as a result, the gas outlet mask is not shown in the present drawing.

In order to provide for rupture of disc member 11 in this instance, there is permitted the longitudinal outward movement of backup rod member 12 away from the supporting of the surface of disc 11 whereby it may be deformed and broken by the gas pressure exerted from the outlet 9 of capillary tubing 5. Conversely, to preclude the breakage of rupture disc 11, the upper portion 15 for rod member 12 extends to a zone adjacent the top of the large threaded plug member 3 and is held in place by a hinged cap member 16. The latter is in turn held by a pull pin means 20.

As best shown in FIGS. 2 and 3, there is shown a recessed portion within the top of the plug section 3 to accommodate the upper movable cap section 16 which in turn provides for holding the backup rod 12. The cap 16 is hinged at one end with a cylindrical bearing portion 17 around a pin means 18, while at the opposite end there is provided a downwardly projecting portion 19 having a hole therethrough to accommodate the passageway of a pull pin 20. Also, as best shown in FIG. 2, there is the indication that the end of the pin member 20 passes through a portion of the hexagon head of section 3, as shown at 21, as well as pass through a hole in portion 19, to come to rest in a socket or recessed portion 22 of the upper portion of plug member 3. Thus, to make the unit operational, it will be seen that upon the removal of the pull pin 20 there will be a release of cover section 16, to permit an upward pressure against rupture disc 11 in passageway 10, a breakage of disc 11 and an outward movement of rod member 12 to permit gas flow through the passageway 10 to outlet nozzle 14. It will also be noted in connection with FIG. 1 of the drawing, that within a recessed portion of the release section 3 and around the top of end portion 15 of the elongated rod member 12 that there is an O-ring seal member 23 which in turn is held in place by a threaded plug member 24. As a result there is substantially no escape of gas from the upper portion of passageway 10 and around the upper rod portion 15.

It may be noted that various construction methods may be provided to hold the rupture disc means such as 11 across the passageway 10, as well as varying means to effect the rupture of such disc. In the present embodiment, as best shown in FIG. 1, it will be noted that the disc 11 is held between an upper portion of support tube 4 and below a separate internal ring section 25, each of which surround the lower longitudinal portion of rod member 12 and define the lower portion of passageway 10. This arrangement provides for the easy replaceability of rupture disc member 11 within the entire removable release section 3. Also, while the present arrangement provides for the rupture of a thin easily broken disc 11 by the removal of a backup-type support member 12, there may be actuating means which would, in effect, reverse the direction of movement of the rod member so that it could push downwardly, or inwardly, toward the interior of the cylinder and effect a puncturing of an adjacent rupture member whereby to initiate gas flow from the interior of the cylinder.

Referring still further to FIG. 1 of the drawing, it will be seen that there is another rupture disc used in the system, and more particularly, the burst disc 26 which is positioned across the lower face portion of a disc-holding bushing 27. The latter, in turn, encompasses the interior portion of a passageway 28 which is shown extending to a gas outlet orifice 29 adjacent the top surface of the plug member 3. Thus, in the event of an overpressuring of the gas container 1 there will be a rupture of disc 26 and gas flow inwardly from the interior of the cylinder to an escape orifice, such as 29. On the other hand, in a preferred embodiment of the improved gas release system, there will be a transverse gas passageway 30 communicating with the large passageway 28 such that a major portion of the gas release from an overpressure situation will be upwardly into gas passageway 28 and then split into the passageway 30 which will extend transversely across the plug member 3 from one side to another. The advantage of the transverse passageway 30, which has two diametrically opposed outlets therefrom, is the provision of a fast release of pressure from the cylinder without causing torque or twist on the entire device.

Figure 4:
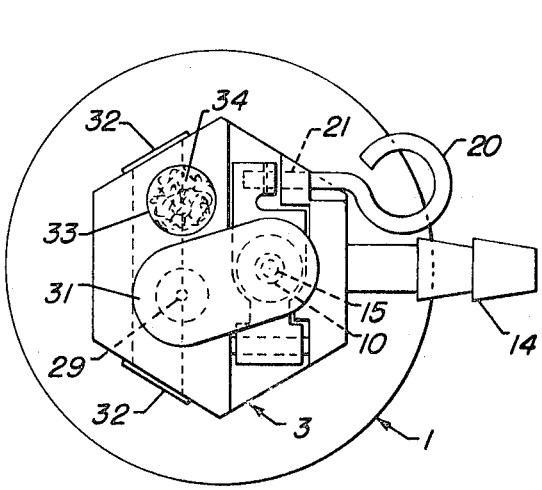
FIG. 4 indicates diagrammatically, in a modified plan view, the use of seal members over the upper extremities of gas outlet ports in order to provide a visual inspection as to whether there has been loss of pressure from the supply device.

In FIG. 4 of the drawing, there are indicated the use of various thin seal members across the top and side portions of the plug member 3. In other words, there is indicated diagrammatically the use of a single seal member 31 extending across the top of plug member 3 in a manner to seal over the outlet orifice 29 as well as over the top of the movable and hinged cap section 16, which in turn covers the upper end portion of the vertical passageway 10. Thus, any breakage or loosening of the seal 31 in the zone of the orifice 29 would indicate that there has been release of pressure by way of passageway 28 and a breakage or leakage in burst disc 26. On the other hand, any loosening of the seal member 31 over the movable cap portion 16 would indicate that there had been a lifting of the hinged cap member 16 or a leakage through passageway 10 and around the cap member 16 to, in turn, show a rupture in the disc 11. There are also shown diagrammatically the use of thin seal members 32 across the open diametrically opposed ends to passageway 30 within the upper gas release section 3. Thus, the loosening of either or both of the seal members 32 will show that there has been a release of gas from the storage cylinder into the overpressure outlet passageways 28 and 30 by reason of breakage of the burst disc 26.

Various methods may be utilized to provide gas introduction into the pressure cylinder 1; however, as indicated diagrammatically in FIGS. 2, 3 and 4 there is shown a separate gas inlet passageway longitudinally through the entire plug section 3 at opening 33 and a subsequent filling of such opening with plugging materials 34. Generally, the material 34 may be solder or other suitable type potting compound capable of attachment to the walls of the passageway 33.

It may also be noted that various materials may be utilized in the construction of the entire unit, with thicknesses being provided to furnish ample strength for the particular pressure conditions to be encountered. Generally, the various parts of the gas release unit may be made of stainless steel in order to preclude corrosion problems and to insure ample strength in the system for accommodating pressures within cylinder 1 of the order of 3,000 p.s.i.g. or more. On the other hand, the cylinder or storage container portion of the unit may be made of lightweight aluminum in order to provide a reduction of weight to the entire device. The aluminum wall thickness is, of course, sufficient to provide ample resistance to bursting for the pressure conditions to be involved. The rupture disc 11, as well as the burst disc 26, preferably shall be made of thin stainless steel for a unit which is to be stored over a long period of time, although where a disc is to be easily broken, then it may be made of copper or of a nonsparking berrylium copper. With regard to the thin seal members, such as 31 and 32, they may be made of a thin type material, in the nature of a label, which may be bonded to the upper threaded plug member 3, and which, in turn, may have thin pieces of aluminum bonded thereto at the zone of the actual openings which are covered. The seals may be partially scored to permit them to hang open or tear under exertion of the venting pressure, whereby a ruptured label or seal will readily indicate that there has been a ruptured or burst disc within the interior of the unit and that such unit should not be retained in service without having its disc members replaced and the unit repressured.

Where noncontaminated clean gas is available for filling each of the containers of the present type of device, there may be an elimination of the filtering member 8 from each of the units; however, in any device where there is a chance of material blocking the extended length of the capillary tubing 5, it is generally of advantage to have a fine frit or filter type disc member such as 8 placed upstream from the capillary tubing opening at 6. The filter member may be of varying materials but, again, a preferred embodiment will generally utilize a sintered stainless steel material of the order of 35 to 40 micron size so as to preclude the passage of contaminating particles entering the capillary tubing section.

Various methods may also be used to position and hold the capillary tubing section 5 into place within the lower interior portion of the plug section 3; although, as best shown in FIG. 1, the present embodiment has the capillary tubing 5 coiled around the support member 4 and the inlet end 6 extending through a soldered connection at the zone S'. Also, at the downstream end of the tubing at 9, there is additional solder S" placed around the upper portion of support tube 4 and in the interior thereof such that there is no chance of any leakage around the capillary tubing into passageway 10. It may also be pointed out that modifications in design and construction as to detailed methods of handling or positioning of particular passageways or other portions of the release system may be carried out without departing from the scope of the present invention.

I claim as my invention:

1. An oxygen supply unit for emergency use, which comprises in combination, a high-pressure cylinder, a gas release section connected to and extending into said cylinder, with such release section providing at least in part a laminar flow passageway portion through the interior thereof to reduce gas pressure to a gas outlet nozzle on the interior of such section, said gas release section further having a gas inlet portion, an open-ended and extended length capillary tubing extending from the latter as said laminar flow passageway portion extending from the inlet portion of the release section to a larger gas passageway portion, the latter in turn communicating with said gas outlet nozzle, movable flow-blocking means within said larger gas passageway portion, said movable flow-blocking means comprising a transverse rupture disc and a longitudinally movable flow-blocking member adapted for movement away from said disc to permit rupture thereof and gas flow to said gas outlet nozzle, said blocking member being held in place against said disc by a hinged cap member over said rupture disc and a movable pull pin means positioned through a portion of the end of said cap member as a release means therefor, and external actuating means connective to said movable flow-blocking means whereby gas flow can be initiated from the interior of the high-pressure cylinder to said gas outlet nozzle for use therefrom, a support tube, said support tube extending below said larger gas passageway portion, said laminar flow passageway comprising a capillary tubing of extended length wound about said support tube, said extended length being of sufficient dimension, and the internal diameter of said capillary tubing being sufficiently small, to thereby restrict any flow except controlled, normal, oxygen release flow at a rate to provide at least 10 minutes oxygen supply, means to indicate leakage in said unit from breakage of said rupture disc, said last-named means comprising a thin seal member over said movable cap member and above the top of the gas passageway and communicating with said outlet nozzle and accommodating said flow-blocking member, said gas release section having an overpressure gas passageway therethrough extending through the gas release section to the interior of said cylinder and including an overpressure burst disc across the interior portion thereof to preclude leakage therefrom except for such pressures as may be excessive for said unit.

2. The oxygen supply unit of claim 1 still further characterized in that said overpressure gas passageway includes as a portion thereof a transverse gas passageway section extending transversely across said gas release section to provide two diametrically opposed outlets therefrom, whereby any torque effect on the unit will be precluded in the event of a breakage of said burst disc.

3. The oxygen supply unit of claim 2 still further characterized in that each of the diametrically opposed gas outlet passageways have thin seal members thereover, whereby to provide an indication of breakage of the burst disc within the interior of said unit.

* * * * *